United States Patent
Li et al.

(10) Patent No.: US 7,230,925 B2
(45) Date of Patent: Jun. 12, 2007

(54) LOAD BALANCE DEVICE AND METHOD FOR PACKET SWITCHING

(75) Inventors: Chin-Chang Li, Taipei (TW); Saten Shih, Taipei (TW)

(73) Assignee: VIA Technologies, Inc., Hsin Tien, Taipei County (TW)

( * ) Notice: Subject to any disclaimer, the term of this patent is extended or adjusted under 35 U.S.C. 154(b) by 1064 days.

(21) Appl. No.: 10/214,616

(22) Filed: Aug. 9, 2002

(65) Prior Publication Data

US 2003/0063594 A1    Apr. 3, 2003

(30) Foreign Application Priority Data

Aug. 13, 2001   (TW) ............................... 90119762 A

(51) Int. Cl.
*G06F 11/34*    (2006.01)
(52) U.S. Cl. ..................................... 370/237; 718/105
(58) Field of Classification Search ................ 370/237; 718/105
See application file for complete search history.

(56) References Cited

U.S. PATENT DOCUMENTS

| | | | |
|---|---|---|---|
| 6,363,396 B1 * | 3/2002 | Klots et al. ............. | 707/103 Y |
| 6,658,565 B1 * | 12/2003 | Gupta et al. ................ | 713/153 |
| 6,731,599 B1 * | 5/2004 | Hunter et al. ............... | 370/229 |
| 6,772,211 B2 * | 8/2004 | Lu et al. ..................... | 709/226 |
| 7,020,713 B1 * | 3/2006 | Shah et al. .................. | 709/235 |
| 2004/0252639 A1 * | 12/2004 | Hunter et al. ............... | 370/229 |
| 2006/0085554 A1 * | 4/2006 | Shah et al. .................. | 709/235 |

* cited by examiner

*Primary Examiner*—Wellington Chin
*Assistant Examiner*—Kevin Mew
(74) *Attorney, Agent, or Firm*—Bacon & Thomas, PLLC

(57) ABSTRACT

In a trunking-port network environment, a ticket assigner and a ticket distributor are included in a packet switch load balance device together to achieve an output load balance during the transmission process of packet switching. The ticket assigner assigns one of the tickets to a packet received by a logical port, and the ticket distributor determines which one of the physical output ports to transmit the packet according to the assigned ticket. In the transmission process, a load monitor dynamically adjusts the ticket distribution scheme used for the ticket distributor, and thus the load balance is optimized.

13 Claims, 4 Drawing Sheets

LOAD BALANCE DEVICE AND METHOD FOR PACKET SWITCHING

BACKGROUND OF THE INVENTION

1. Field of Invention

The invention relates to a packet switching load balance device and method, more particularly, to a device and method with balanced output loads used in a trunking-port network environment. During distributing packets through a switching system, the load balance of the output is achieved by using a ticket distribution mechanism and a ticket assignment mechanism.

2. Related Art

As the Internet becomes more popular and the users increase rapidly, to increase the bandwidth for allowing heavier network traffic, two or more transmission ports are often trunked together. However, merely increasing the bandwidth without a good mechanism for uniform distribution, the transmission flows may still jam at a particular transmission port. Therefore, it is highly desirable to build up an effective management mechanism for fully utilizing the existing bandwidth.

Generally speaking, the network traffic is closely related to the data types, peak time flows, and the number of users. The packet switching technology can effectively improve the network efficiency. In the Internet, data have to be exchanged through a plurality of network nodes to the destination. FIG. 1 shows a trunking port network transmission system architecture.

When an upper-layer user 1 wants to send out data, the data are separated into several packets. That is, the data are partitioned first before being sent out and then recombined after all of them are received. These packets are assigned their routes through a switching system 2 and transmitted to the Internet 4 via several aggregated links 3. As far as the system architecture is concerned, it is mainly several transmission ports trunked together. For the physical layer in the seven-level network structure of an OSIRM (Open System Interconnect Reference Model), these transmission ports are physically independent. For an upper-layer user/application, however, only one logical port is seen. This logical port is part of the switching system, corresponding to two or more than two physical output ports. The upper-layer user sends the packets to the logical port. The driver decides how to distribute the data flow received from the upper-layer in order to further send out the received packets through different physical output ports, so as to achieve the load-balancing.

FIG. 2 shows a conventional network data transmission structure. When an upper-layer user 1 wants to send out data, the packets are passed by an operating system 7 down to a logical port 8. The logical port 8 determines which physical output port 9 for each packet transmission.

According to the prior art, when the upper-layer user transmits packets, the physical output port for each packet is determined by the last bit of its source address. However, prior art easily causes transmission load unbalance in the system. In particular, when the same upper-layer users want to transmit a huge amount of data, the data are partitioned into many packets having the same source address. Therefore, all these packets are assigned the same physical output port, resulting in load unbalance in the system.

SUMMARY OF THE INVENTION

An objective of the invention to provide a device and a method used in a trunking port network transmission environment that utilizes a ticket distribution mechanism and a ticket assignment mechanism to assure the output load balance during the transmission process of the packet switching.

During the packet switching, a load monitor is capable of dynamically adjusting the ticket distribution mechanism to optimize the load balance.

For a logical port of a switching system, the packet switching system of the present invention comprises a ticket assignment mechanism, which takes a plurality of bits of the source address and the destination address of a packet and performs a logical operation to obtain a ticket for the packet; a ticket distribution mechanism, which distributes packets according to assigned tickets to the physical output ports; and a load monitoring mechanism, which periodically evaluates the loads of the tickets assigned to packets and finds out a suitable ticket distribution, thereby determining a ticket distribution scheme for a next period. The present invention can assure the optimal load balance among the physical output ports and fully utilize existing bandwidth resources.

BRIEF DESCRIPTION OF THE DRAWINGS

The present invention will become more fully understood from the illustration hereinbelow only without limiting or restricting the present invention, and wherein.

DETAILED DESCRIPTION OF THE INVENTION

Figure 3:
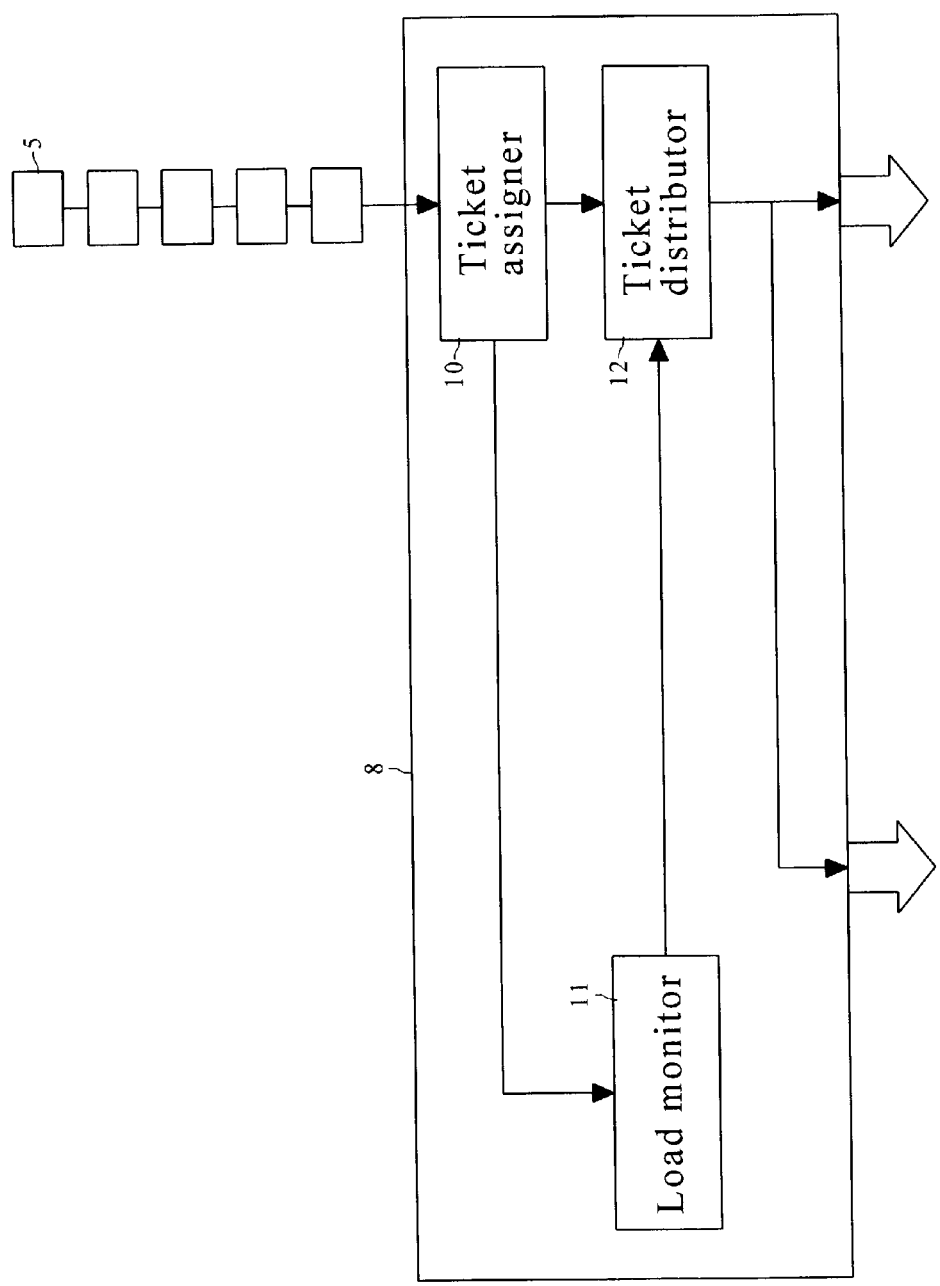
FIG. 3 is an internal structural diagram of the load balance device of one logical port of a switching system according to one embodiment of the present invention.

With reference to FIG. 3, the load balance device of the invention is implemented on the logical port of a switching system, where two physical output ports 9 are trunked as the logical port but is certainly not limited by the example. The disclosed load balance device comprising: a ticket assignment mechanism, a ticket distribution mechanism, and a load monitoring mechanism. The ticket assignment mechanism is implemented by a ticket assigner 10. For example, some bits in the source address and destination address of the data packet 5 transmitted by an upper-layer user are extracted and performed with an XOR logical operation. The operation result is assigned as the ticket of the data packet 5. The ticket distribution mechanism is implemented by a ticket distributor 12. With a dynamical ticket distribution, the packet 5 with a ticket is distributed to a corresponding physical output port 9 for transmission. The load monitoring mechanism is implemented by a load monitor 11. The load monitor 11 periodically computes the accumulated load of each ticket assigned to a plurality of packets, to evaluate several ticket distribution schemes and find out an optimized one. The dynamical ticket distributor 12 then executes the selected ticket distribution scheme to distribute the packets 5 to the physical output ports correspondingly.

Figure 1:
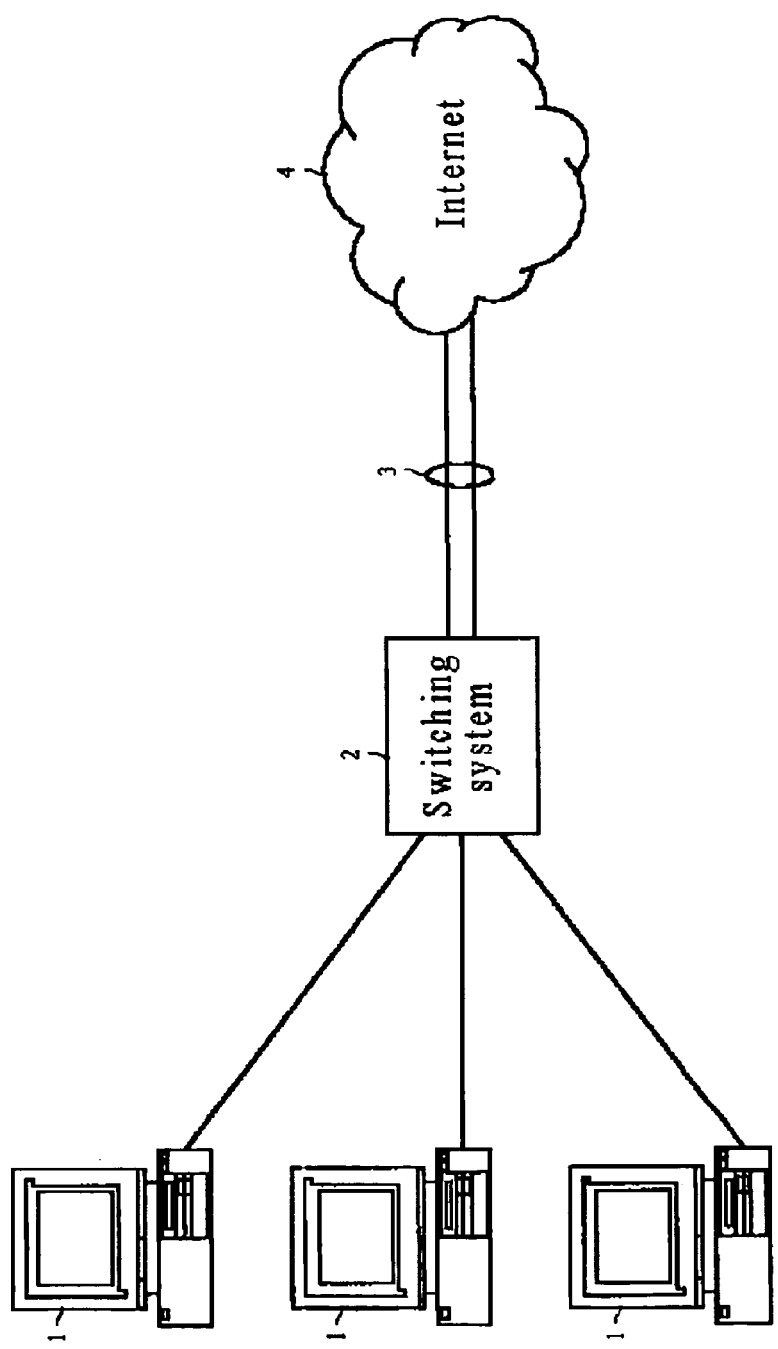
FIG. 1 is a structural diagram of a conventional trunking port network transmission system.
Figure 2:
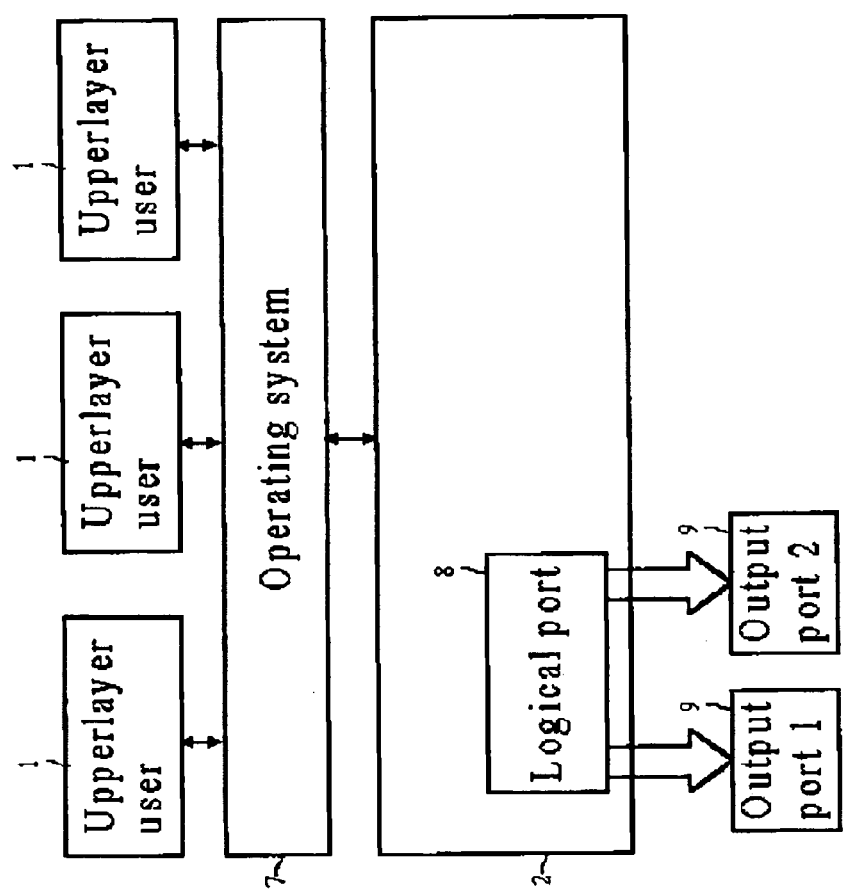
FIG. 2 is a structural diagram of a conventional switching system.

As shown in FIG. 2, when an upper-layer user 1 sends out data, the data are partitioned into several packets 5. That is, the data are partitioned first before being sent out and then recombined after all of them are received. The packet 5 is transmitted by an OS (Operating System) 7 to a logical port 8. When the packet 5 reaches the logical port 8, the ticket assigner 10 assigns a ticket to each packet 5 to be transmitted and sends the packet 5 to the ticket distributor 12. The ticket distributor 12 then dynamically distributes the packets 5 to the physical output ports 9 according to the ticket distribution scheme selected by the load monitor 11. In the meantime, the load monitor 11 periodically computes the accumulated load for each ticket assigned to a plurality of packets by the ticket assigner 10. The computed result is then used to determine an optimized ticket distribution scheme so that the physical output ports 9 are balanced in load. Three mechanisms are described in the following as examples.

Ticket Assignment Mechanism

When the packet 5 is sent to the logical port 8 in a switching system, the ticket assigner 10 of the present invention extracts the last three bits of the source address and the last three bits of the destination address of the packet 5, depending on the maximum number of trunked physical ports in a logic port. The extracted bits are performed with, for example, an XOR logical operation as the ticket for the packet 5. The ticket assigner 10 assigns a ticket to each packet 5 in order. After the logical operation, the ticket value takes an integer from 0 to 7. Using this ticket assignment mechanism, each packet 5 entering the logical port 8 is assigned a ticket. The reason using the source address (SMAC) and the destination address (DMAC) as the basis to compute the ticket value is to avoid the packets belonging to the same data flow from being mis-ordered by the dynamical load balance device and thus lowering the network efficiency.

Ticket Distribution Mechanism

After the packets 5 are tagged with tickets by the ticket assigner 10 in order, the ticket distributor 12 determines which physical output port 9 each ticketed packet 5 should be sent to in the next fixed period according to the ticket distribution scheme selected by the load monitor 11. In a preferred embodiment of the present invention, the ticket distribution scheme indicated by the load monitor 11 distributes the tickets with integer values from 0 to 7, preferably depending on the maximum number of trunked physical ports in a logic port, corresponding to various physical output ports 9 in response to the accumulated packet load for each ticket in the previous period.

Ticket Monitoring Mechanism

Since each packet 5 is associated with a ticket by the ticket assignment mechanism in order, the load monitor 11 accumulates the load for each ticket within a predetermined period. For example, the total packet length associated with the ticket can be taken as the load. The predetermined period can be adjusted according to the system performance, which depends upon the quality required by the user and the ASIC performance, etc. Different ticket distribution schemes are periodically evaluated to find out which one optimizes the load distribution for the physical output ports 9. This optimized scheme is then used for the ticket distributor 12 to perform ticket distribution.

Let's explain in further detail the mechanism of evaluating the ticket distribution in the load monitoring. The algorithm of ticket distribution Method 1 is described as follows:

```
1.  LoadPerTicket[ ] = {λ₁, λ₂, . . . , λₜ}
2.  UnAssignTicket[ ] = {T₁, T₂, . . . , Tₜ}
3.  δ = (λ₁ + λ₁ + ··· + λₜ) / Pg
4.  foreach p in group {
5.      While(Bp<δ ‖ UnAssignTicket[ ]) {
6.          set Ticket = Tmin(LoadPerTicket[ ])
7.          Bp = Bp + λTicket
8.          add Ticket to port p
9.          del Ticket from UnAssignTicket[ ]
10.     }
11. }
12. foreach p in group {
13.     foreach ticket {
14.         if(ticket∈p) {
15.             LoadPerPortM1[p]=LoadPerPortM1[p]+LoadPerTicket[ticket]
16.         }
17.     }
18.     DiffPerPortM1[p]=ABS(δ - LoadPerPortM1[p])
19.     DiffTotalM1=DiffTotalM1 + DiffPerPortM1[p]
20. }
```

In the above algorithm, the array LoadPerTicket[ ] in line 1 stores a plurality of loads according to the accumulated total packet length associated with each ticket value. The array UnAssignTicket[ ] in line 2 stores the tickets yet assigned to any physical output port. δ in line 3 computes the average load of the ideal output port, where $P_g$ denotes the number of physical output ports in a logical port. Foreach-loop in line 4 defines the jobs listed in lines 5 through 10 to assign tickets to the physical output ports. While-loop in line 5 defines the jobs listed in lines 6 through 9 to repeat executing till the accumulated load $B_p$ of UnAssignTicket[ ] reaches the average load δ. In particular, line 6 denotes the ticket with the minimal load λ is extracted from the array LoadPerTicket[ ]. Line 7 denotes the load of the ticket is added to the accumulated load $B_p$. Line 8 represents that the ticket currently with the minimal load among the array UnAssign Ticket[ ] is assigned to the physical output port p. Line 9 denotes the assigned ticket is removed from the array UnAssignTicket[ ].

Afterwards, foreach-loop in line 12 lists the jobs in lines 13 through 19 to compute the differences between each physical output port load and the ideal average load thereof. The foreach-loop in line 13 defines the jobs listed in lines 14 through 16 to compute the accumulated load of each physical output port p for each ticket. Lines 14 and 15 take the result of assigning the ticket to the physical output port by the foreach-loop defined in line 4 and accumulate the ticket load of the same physical output port, to record the accumulated load in the array LoadPerPortM1[ ]. The array DiffPerPortM1[ ] in line 18 stores the absolute difference between the accumulated load and the ideal average load δ at each physical output port p according to the ticket distribution Method 1. Finally, line 19 computes the accumulated difference according to Method 1 and stores it in DiffTotalM1.

Next, the algorithm of ticket distribution Method 2 is described as follows:

```
1.  LoadPerTicket[ ] = {λ₁, λ₂, . . . λₜ}
2.  UnAssignTicket[ ] = {T₁, T₂, . . . , Tₜ}
```

-continued

3. $$\delta = \frac{\lambda_1 + \lambda_1 + \cdots + \lambda_t}{P_g}$$

4. While(UnAssignTicket[ ]) {
5.    set Ticket = $T_{min(LoadPerTicket[\ ])}$
6.    add Ticket to port p
7.    del Ticket from UnAssignTicket[ ]
8.    p=next port in group
9. }
10. foreach p in group {
11.    foreach ticket {
12.      if(ticket∈p) {
13.        LoadPerPortM2[p]=LoadPerPortM2[p]+LoadPerTicket[ticket]
14.      }
15.    }
16.    DiffPerPortM2[p]=ABS($\delta$ − LoadPerPortM2[p])
17.    DiffTotalM2=DiffTotalM2 + DiffPerPortM2[p]
18. }

In Method 2, the array LoadPerTicket[ ] in line 1 stores a plurality loads according to the packet length associated with each ticket value. The array UnAssignTicket[ ] in line 2 stores the tickets yet assigned to any physical output port. While-loop in line 4 defines the jobs listed in lines 5 through 8 that the tickets yet assigned to the physical output ports in the array UnAssignTicket[ ]. Line 5 denotes the ticket with the minimal load $\lambda$ is extracted from the array LoadPerTicket[ ]. Line 6 denotes the ticket currently with the minimal load is assigned to the physical output port p. Line 7 denotes the assigned ticket is removed from the array UnAssignTicket[ ]. Line 8 denotes the p is assigned to the next physical output port.

Afterwards, foreach-loop in line 10 defines the jobs listed in lines 11 through 17 to compute the differences between each physical output port load and the average thereof. The foreach-loop in line 11 defines the jobs listed in lines 12 through 13 to compute the accumulated load of each physical output port for each ticket. Lines 12 and 13 take the result of assigning the ticket to the physical output port by the While-loop defined in line 4 and accumulate the load for each physical output port p, to record a plurality of accumulated loads in the array LoadPerPortM2[ ]. The array DiffPerPortM2[ ] in line 16 stores the absolute difference between the accumulated load and the ideal average load $\delta$ at each physical output port p according to the ticket distribution Method 2. Finally, line 17 computes the accumulated difference according to Method 2 and stores it in DiffTotalM2.

Therefore, the load monitoring mechanism of the present invention evaluates the ticket distribution schemes in Method 1 and Method 2. The accumulated differences DiffTotalM1 and DiffTotalM2 are derived after the tickets are assigned to the physical output ports. The one with a smaller accumulated difference means that the ticket distribution scheme results in an optimized load balance at each physical output port. The load monitoring mechanism then instructs the ticket distribution mechanism to enable the ticket distribution scheme found above at the next period. Two examples are illustrated how to select ticket distribution schemes according to the load associated with each ticket.

EXAMPLE 1

Suppose there are eight tickets (e.g. $T_1, T_2, \ldots,$ and $T_8$) that can be assigned to a packet 5 and there are two physical output ports in a logical port 8 of a switch. After a predetermined period, e.g. 5 minutes, the load for each ticket accumulated by the load monitoring mechanism in view of the packet length, i.e. a total packet length for each ticket is:

LoadPerTicket[8]={0,10,0,10,0,10,0,30}.

The loads in LoadPerTicket[8] give an ideal average load $\delta$=30 for each physical output port. According to the ticket distribution in Method 1, tickets with smaller loads are extracted in order and assigned to Port 1 till the accumulated load at Port 1 is greater than the average load $\delta$. Afterwards, the remaining ticket(s) is assigned to Port 2. Therefore, the following result is obtained Port1: $T_1,T_3,T_5,T_7,T_2,T_4,T_6$
Port2: $T_8$ Therefore, the accumulated loads of Port 1 and Port 2 are 30(=0+0+0+0+10+10+10) and 30(load of the ticket $T_8$), respectively. The accumulated difference of each physical output port after the tickets are assigned to the ports according to Method 1 is then:

DiffTotalM1=0+0=0.

According to Method 2, the tickets with small loads are extracted in order and assigned to Port 1 and Port 2, respectively. At the end, the following result is obtained:
Port1: $T_1,T_5,T_2,T_6$
Port2: $T_3,T_7,T_4,T_8$ Therefore, the accumulated loads at Port 1 and Port 2 are 20(=0+0+10+10) and 40(=0+0+10+30), respectively. The accumulated difference at each physical output port after the tickets are assigned to the ports according to Method 2 is then:

DiffTotalM2=10+10=20.

Thus, the load monitoring mechanism selects Method 1 with the smaller accumulated difference and implements Method 1 in the ticket distribution mechanism. The packet switching technology of the switching system can achieve load balance at each output port.

EXAMPLE 2

Suppose there are eight tickets (e.g. $T_1, T_2, \ldots,$ and $T_8$) that can be assigned to a packet 5 and there are two physical output ports in a logical port 8 of a switch. After a predetermined period, e.g. 5 minutes, the load for each ticket accumulated by the load monitoring mechanism in view of the packet length, i.e. a total packet length for each ticket is:

LoadPerTicket[8]={10,10,20,20,30,30,40,40}.

The load accumulated by LoadPerTicket[8] gives an average load $\delta$=100. According to the ticket distribution scheme in Method 1, the tickets with smaller loads are extracted in order and assigned to Port 1 till the accumulated load at Port 1 is greater than the average load $\delta$. Afterwards, the remaining tickets are assigned to Port 2. Therefore, the following result is obtained:
Port1: $T_1,T_2,T_3,T_4,T_5,T_6$
Port2: $T_7,T_8$ Therefore, the accumulated loads of Port 1 and Port 2 are 120(=10+10+20+20+30+30) and 80(=40+40), respectively. The accumulated difference of each physical output port after the tickets are assigned to the ports according to Method 1 is then DiffTotalM1=20+20=40.

According to Method 2, the tickets with smaller loads are extracted in order and assigned to Port 1 and Port 2, respectively. The result is obtained as:

Port1: $T_1,T_3,T_5,T_7$

Port2: $T_2,T_4,T_6,T_8$

Therefore, the accumulated loads at Port 1 and Port 2 are 100(=10+20+30+40) and 100(=10+20+30+40), respectively. The accumulated difference at each physical output port after the tickets are assigned to the ports according to Method 2 is derived as DiffTotalM2=0+0=0.

Therefore, the load monitoring mechanism selects Method 2 as the ticket distribution mechanism so that the packet switching technology can achieve a better load balance at each physical output port than Method 1.

In view of the above two example, it should be noted that for Method 1, each physical output port reaches a better load balance when there are larger differences among the loads of tickets. Contrastly, for Method 2, each physical output port reaches a better load balance when there are smaller differences among the loads for tickets. Therefore, when the load balance device and method of the present invention are implemented in a switching system, a better ticket distribution scheme can be dynamically adjusted and found. The invention is capable of achieving a better load balance among all physical output ports, thus effectively enhancing the utilization of the network bandwidth.

Figure 4:
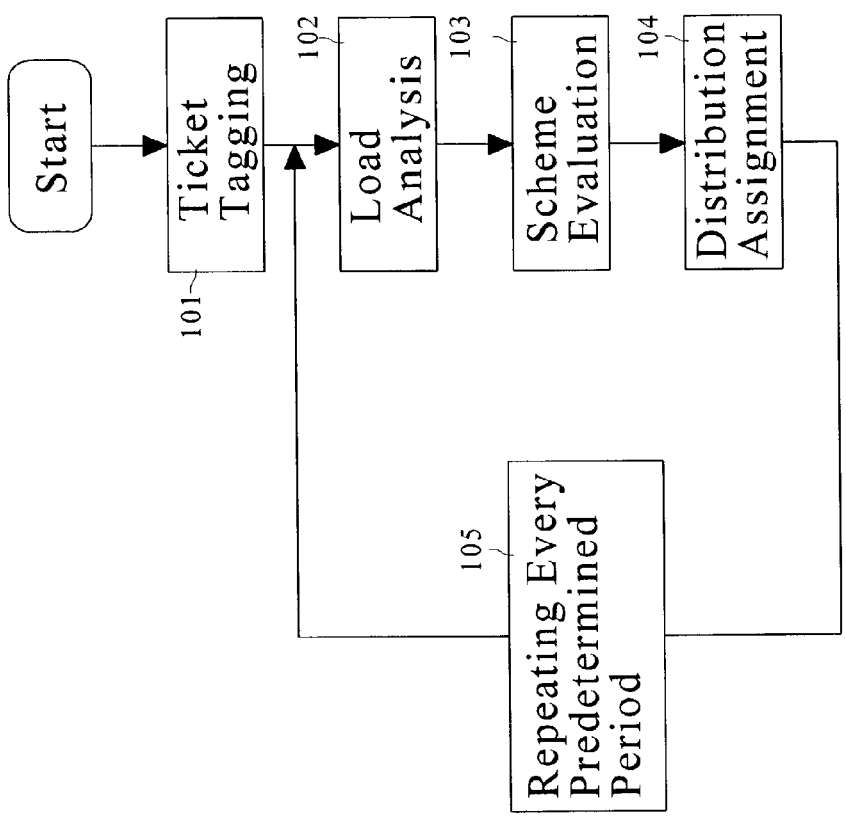
FIG. 4 is a flowchart for the packet switching load balance according to one embodiment of the present invention.

Furthermore, the present invention discloses a load balance method as shown in FIG. 4, including the following steps:

Step 101: Ticket Tagging

In the switching system 2, when a packet 5 is transmitted to the logical port 8, the last three bits of the source address and the destination address are extracted to perform an XOR operation. The result ranges from 0 to 7 which are the tickets to be tagged to the packet 5.

Step 102: Load Analysis

After a predetermined period, the load of each ticket obtained in step 101 assigned to the packet 5 is accumulated for load analysis.

Step 103: Scheme Evaluation

According to the load computation result of each ticket, the load distributions achieved by different ticket distribution schemes are evaluated so as to dynamically select a better scheme for the next period. In the above embodiment of the present invention, two load distribution schemes are discussed.

Step 104: Distribution Assignment

After the scheme for optimal ticket distribution has been chosen through evaluation in step 103, such scheme is then utilized to distribute packets with different tickets to the physical output ports 9. Therefore, each packet 5 is transmitted to a corresponding physical output port 9 according to the ticket assigned through step 101 via the transmission route of said distribution scheme.

Step 105: Repeating Every Predetermined Period

Within a predetermined period, the packet-transmission load of each ticket (e.g., the ticket value 0 to 7) is continuously accumulated.

As the switching system performs step 101 to step 104, the physical output ports 9 reaches the optimal load-balancing distribution. After the predetermined period in step 105, the switching system repeats from step 101 to optimally balance load for packets distribution in the next period.

EFFECTS OF THE INVENTION

The packet-switching load balance device and method of the present invention have many advantages and features. For example, the invention uses the ticket distribution mechanism and the ticket assignment mechanism to achieve the output load balance during packet switching in a trunking-port network transmission environment.

Another advantage of the invention is that the load monitoring mechanism is employed to dynamically adjust the ticket distribution scheme so that the load can be balanced in a trunking-port network transmission environment.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A load balance device for a logical port containing a plurality of physical output ports, the load balance device comprising:

a ticket assigner, which assigns one of a plurality of tickets to a packet received by the logical port;

a ticket distributor, which determines a transmission route according to the assigned ticket so that the packet is transmitted through one of the physical output ports, wherein said ticket distributor evaluates a plurality of schemes for distributing said tickets to the physical output ports so as to balance the load for the physical output ports and one of the schemes includes computing an average load of all tickets, and assigning said tickets progressively in order, for each physical output port, according to the accumulated packet lengths to said each physical output port until a load sum for said each physical output port exceeds the average load; and a load monitor, which monitors a plurality of loads associated with the tickets.

2. The load balance device of claim 1, wherein the ticket assigner extracts partial bits of a source address and a destination address of the packet to perform a logical operation, in order to generate a result as the ticket of the packet.

3. The load balance device of claim 2, wherein the ticket assigner extracts a plurality of bits of the source address and a plurality of bits of the destination address of the packet according to a number of the physical output ports.

4. The load balance device of claim 3, wherein the ticket assigner performs an XOR operation on the extracted bits to obtain the result as the ticket of the packet.

5. The load balance device of claim 4, wherein the load monitor accumulates a plurality of total packet lengths associated with the tickets during a fixed period as the loads respectively.

6. The load balance device of claim 5, wherein the load monitor determines the transmission route according to the loads so that the plurality of physical output ports achieves load balance.

7. A load balance device for a logical port containing a plurality of physical output ports, the load balance device comprising:

a ticket assigner to assign one of a plurality of tickets to a packet received by the logical port, the assigned ticket is obtained from a logical operation of partial bits extracted from a source address and a destination address of the packet; and a ticket distributor to determine which one of the physical output ports to transmit the packet according to the assigned ticket, wherein said ticket distributor evaluates a plurality of schemes for distributing said tickets to the physical output ports so as to balance the load for the physical output ports and one of the schemes includes computing an average load of all tickets, and assigning said tickets progressively in order, for each physical output port, according to the accumulated packet lengths to said each physical output port until a load sum for said each physical output port exceeds the average load.

8. The load balance device of claim 7, wherein the ticket assigner extracts the last three bits of the source address and the destination address of the packet.

9. The load balance device of claim 8, wherein the ticket assigner performs an XOR operation on the extracted bits.

10. The load balance device of claim 9, wherein the load of the ticket is an accumulated packet length associated with the ticket.

11. A load balance method for the packet switching, comprising the steps of:

assigning a plurality of tickets to a plurality of packets to be transmitted, each ticket is obtained by a logical operation of a plurality of bits extracted from a source address and a destination address of each packet;

accumulating a plurality of total packet lengths associated with the tickets during a first predetermined period;

distributing the tickets to a plurality of physical output ports during a second predetermined period according to the accumulated packet lengths associated with the tickets accumulated during said first predetermined period, wherein evaluating a plurality of schemes for distributing said tickets to the physical output ports as to balance the load for the physical output ports and one of the schemes includes computing an average load of all tickets, and assigning said tickets progressively in order, for each physical output port, according to the accumulated packet lengths to said each physical output port until a load sum for said each physical output port exceeds the average load; and transmitting each packet through a corresponding physical output port according to the associated ticket.

12. The method of claim 11, wherein the assigning step includes a step of extracting the last three bits of the source address and the last three bits of the destination address to perform an XOR operation.

13. The method of claim 11, wherein one of the schemes includes a steps of assigning the tickets progressively in order according to the accumulated packet lengths to the physical output ports.

* * * * *